US012506875B2

(12) United States Patent
Li et al.

(10) Patent No.: US 12,506,875 B2
(45) Date of Patent: Dec. 23, 2025

(54) METHOD AND APPARATUS FOR MOTION VECTOR CODING

(71) Applicant: Tencent America LLC, Palo Alto, CA (US)

(72) Inventors: Guichun Li, San Jose, CA (US); Xin Zhao, San Jose, CA (US); Lien-Fei Chen, Hsinchu (TW); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 62 days.

(21) Appl. No.: 18/381,496

(22) Filed: Oct. 18, 2023

(65) Prior Publication Data
US 2024/0137520 A1    Apr. 25, 2024
US 2024/0236330 A9    Jul. 11, 2024

Related U.S. Application Data

(60) Provisional application No. 63/417,651, filed on Oct. 19, 2022.

(51) Int. Cl.
*H04N 19/139*    (2014.01)
*H04N 19/105*    (2014.01)
(Continued)

(52) U.S. Cl.
CPC ......... *H04N 19/139* (2014.11); *H04N 19/105* (2014.11); *H04N 19/176* (2014.11); *H04N 19/521* (2014.11)

(58) Field of Classification Search
CPC .... H04N 19/105; H04N 19/109; H04N 19/13; H04N 19/139; H04N 19/14; H04N 19/176; H04N 19/52; H04N 19/521; H04N 19/70
See application file for complete search history.

(56) References Cited

U.S. PATENT DOCUMENTS

2005/0038837 A1\* 2/2005 Marpe .................... H04N 19/13
                                                                    708/200
2013/0272377 A1\* 10/2013 Karczewicz ............ H03M 7/30
                                                                    341/51
(Continued)

OTHER PUBLICATIONS

C. Muhammed, et al., Algorithm description of Enhanced Compression Model 6 (ECM 6), Joint Video Experts Team (JVET) of ITU-T SG 16 WP 3 and ISO/IEC JTC 1/SC 29 27th Meeting, by teleconference, Jul. 13-22, 2022, Document: JVET-AA2025, pp. 1-53.

(Continued)

*Primary Examiner* — Anner Holder
(74) *Attorney, Agent, or Firm* — ARENTFOX SCHIFF LLP

(57) ABSTRACT

Processing circuitry receives coded information of a motion vector difference (MVD). The processing circuitry calculates cost values associated with value combinations for a plurality of bits in coding bits of the MVD, at least one of the plurality of bits is a bit in a codeword for indicating a magnitude for the MVD. The processing circuitry determines a combination of prediction values for the plurality of bits from the value combinations, the combination of prediction values is associated with a lowest cost value in the cost values. The processing circuitry decodes the coded information of the MVD to obtain one or more indicators for the combination of prediction values, the one or more indicators indicates whether the plurality of bits is correctly predicted by the combination of prediction values. The processing circuitry determines the MVD based on the combination of prediction values and the one or more indicators.

19 Claims, 10 Drawing Sheets

(51) Int. Cl.
*H04N 19/176* (2014.01)
*H04N 19/513* (2014.01)

(56) References Cited

U.S. PATENT DOCUMENTS

| | | | |
|---|---|---|---|
| 2017/0302953 A1* | 10/2017 | George | H03M 7/42 |
| 2018/0255295 A1* | 9/2018 | Lee | H04N 19/157 |
| 2019/0289317 A1* | 9/2019 | Hsu | H04N 19/139 |
| 2021/0195210 A1 | 6/2021 | Yamaguchi et al. | |
| 2021/0360277 A1 | 11/2021 | Jeong et al. | |

OTHER PUBLICATIONS

International Search Report and Written Opinion issued in Application No. PCT/US2023/077311, mailed Feb. 14, 2024, 11 pages.

* cited by examiner

| mvd_coding( x0, y0, refList, cpIdx ) { | Descriptor |
|---|---|
| abs_mvd_greater0_flag[ 0 ] | ae(v) |
| abs_mvd_greater0_flag[ 1 ] | ae(v) |
| if( abs_mvd_greater0_flag[ 0 ] ) | |
|     abs_mvd_greater1_flag[ 0 ] | ae(v) |
| if( abs_mvd_greater0_flag[ 1 ] ) | |
|     abs_mvd_greater1_flag[ 1 ] | ae(v) |
| if( abs_mvd_greater0_flag[ 0 ] ) { | |
|     if( abs_mvd_greater1_flag[ 0 ] ) | |
|         abs_mvd_minus2[ 0 ] | ae(v) |
|     mvd_sign_flag[ 0 ] | ae(v) |
| } | |
| if( abs_mvd_greater0_flag[ 1 ] ) { | |
|     if( abs_mvd_greater1_flag[ 1 ] ) | |
|         abs_mvd_minus2[ 1 ] | ae(v) |
|     mvd_sign_flag[ 1 ] | ae(v) |
| } | |
| } | |

400

410 — abs_mvd_greater0_flag rows
421 — abs_mvd_greater1_flag[ 0 ] block
422 — abs_mvd_greater1_flag[ 1 ] block
431 — abs_mvd_minus2[ 0 ] / mvd_sign_flag[ 0 ] block
432 — abs_mvd_minus2[ 1 ] / mvd_sign_flag[ 1 ] block

*FIG. 4*

| Input value (abs_mvd_minus2) | Binarization value | |
|---|---|---|
| | Prefix | Suffix |
| 0 | 1 | 0 |
| 1 | 1 | 1 |
| 2 | 01 | 00 |
| 3 | 01 | 01 |
| 4 | 01 | 10 |
| 5 | 01 | 11 |
| 6 | 001 | 000 |
| 7 | 001 | 001 |
| 8 | 001 | 010 |
| 9 | 001 | 011 |
| 10 | 001 | 100 |
| 11 | 001 | 101 |
| 12 | 001 | 110 |
| 13 | 001 | 111 |
| 14 | 0001 | 10000 |
| 15 | 0001 | 10001 |
| 16 | 0001 | 10010 |
| 17 | 0001 | 10011 |
| 18 | 0001 | 10100 |
| 19 | 0001 | 10101 |
| 20 | 0001 | 10110 |
| 21 | 0001 | 10111 |
| 22 | 0001 | 11000 |
| 23 | 0001 | 11001 |
| 24 | 0001 | 11010 |
| 25 | 0001 | 11011 |
| 26 | 0001 | 11100 |
| 27 | 0001 | 11101 |
| 28 | 0001 | 11110 |
| 29 | 0001 | 11111 |
| ... | ... | ... |

*FIG. 5*

METHOD AND APPARATUS FOR MOTION VECTOR CODING

INCORPORATION BY REFERENCE

The present application claims the benefit of priority to U.S. Provisional Application No. 63/417,651, "Method and Apparatus for Motion Vector Coding" filed on Oct. 19, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry. The processing circuitry receives coded information of a current block in a current picture, the coded information includes coded information of a motion vector difference (MVD). The processing circuitry calculates cost values respectively associated with a plurality of value combinations for a plurality of bits in coding bits of the MVD, the plurality of bits include partial codeword for the MVD, at least one of the plurality of bits is a bit in a codeword for indicating a magnitude for the MVD. The processing circuitry determines a combination of prediction values for the plurality of bits from the plurality of value combinations, the combination of prediction values is associated with a lowest cost value in the cost values. The processing circuitry decodes the coded information of the MVD to obtain one or more indicators for the combination of prediction values, the one or more indicators indicates whether the plurality of bits is correctly predicted by the combination of prediction values. The processing circuitry determines the MVD based on the combination of prediction values and the one or more indicators. Further, the processing circuitry determines a motion vector for the current block based on a motion vector predictor (MVP) and the MVD, and reconstructs the current block based on a reference block in a reference picture, the reference block is pointed by the motion vector.

In some examples, the plurality of bits includes first N bins of a suffix of a codeword for indicating the magnitude of at least one of a horizontal component and/or a vertical component of the MVD, N is a positive integer.

In some examples, the one or more indicators includes binary values respectively associated with the first N bins of the suffix, a binary value associated with a bin of the suffix indicates whether the bin of the suffix is predicted correctly in the combination of prediction values.

In some examples, the one or more indicators are context coded in the coded information of the MVD, and the processing circuitry decodes the one or more indicators from the coded information of the MVD according to one or more context model.

In some examples, the one or more indicators are context coded in the coded information of the MVD based on respective context models, and the processing circuitry decodes the one or more indicators from the coded information of the MVD according to respective context models.

In some examples, remaining bins of the codeword are decoded from the coded information of the MVD according to equal probability bins.

In some examples, the plurality of bits includes at least an MVD sign and first N bins of a suffix of the codeword for indicating the magnitude of at least one of a horizontal component and/or a vertical component of the MVD.

In some examples, the processing circuitry calculates template matching cost values respectively associated with the plurality of value combinations.

In some examples, the processing circuitry calculates smoothness cost values respectively associated with the plurality of value combinations.

In some examples, the processing circuitry determines N according to a syntax element in at least one of a video parameter set, a sequence parameter set, a picture header and a slice header.

In some examples, the processing circuitry decodes a prefix value of the codeword, and determines that the decoded prefix value belongs to a subset of prefix values. In response to the decoded prefix value belonging to the subset of prefix values, the processing circuitry calculates the cost values respectively associated with the plurality of value combinations for the plurality of bits that comprises the first N bins of the suffix of the codeword. In an example, the subset of prefix values have more than M bins for each prefix value, M is a positive integer. In an example, the processing circuitry determines M according to a syntax element in at least one of a video parameter set, a sequence parameter set, a picture header and a slice header.

In some examples, the processing circuitry decodes the coded information of the MVD to obtain an indicator bit associated with the combination of prediction values, the indicator bit indicates whether the plurality of bits are correctly predicted by the combination of prediction values.

In some examples, the processing circuitry decodes a flag bin from the coded information of the current block, the flag bin indicating whether a predictor is applied on at least one of a horizontal component and/or a vertical component of the MVD is predicted.

In an example, the processing circuitry determines a context model for the flag bin, and decodes the flag bin according to the context model.

In some examples, the processing circuitry sorts the value combinations according the cost values respectively associated with the value combinations, decodes an index from the coded information of the current block, and selects a combination from the sorted value combinations according to the index.

In some examples, the processing circuitry determines at least a context model for coding one or more bins in a prefix of the codeword, and decodes the one or more bins in the prefix based on at least the context model.

In some examples, the processing circuitry determines context models respectively for first K bins in a prefix of the codeword, and decodes the first K bins respectively according to the context models.

Aspects of the disclosure also provide a non-transitory computer-readable medium storing instructions which, when executed by a computer, cause the computer to perform the method for video decoding/encoding.

BRIEF DESCRIPTION OF THE DRAWINGS

Further features, the nature, and various advantages of the disclosed subject matter will be more apparent from the following detailed description and the accompanying drawings in which:

FIG. 4 shows pseudo code for motion vector difference (MVD) signaling in some examples.

FIG. 5 shows a table that illustrates remainder values and corresponding codewords in some examples.

DETAILED DESCRIPTION OF EMBODIMENTS

Figure 1:
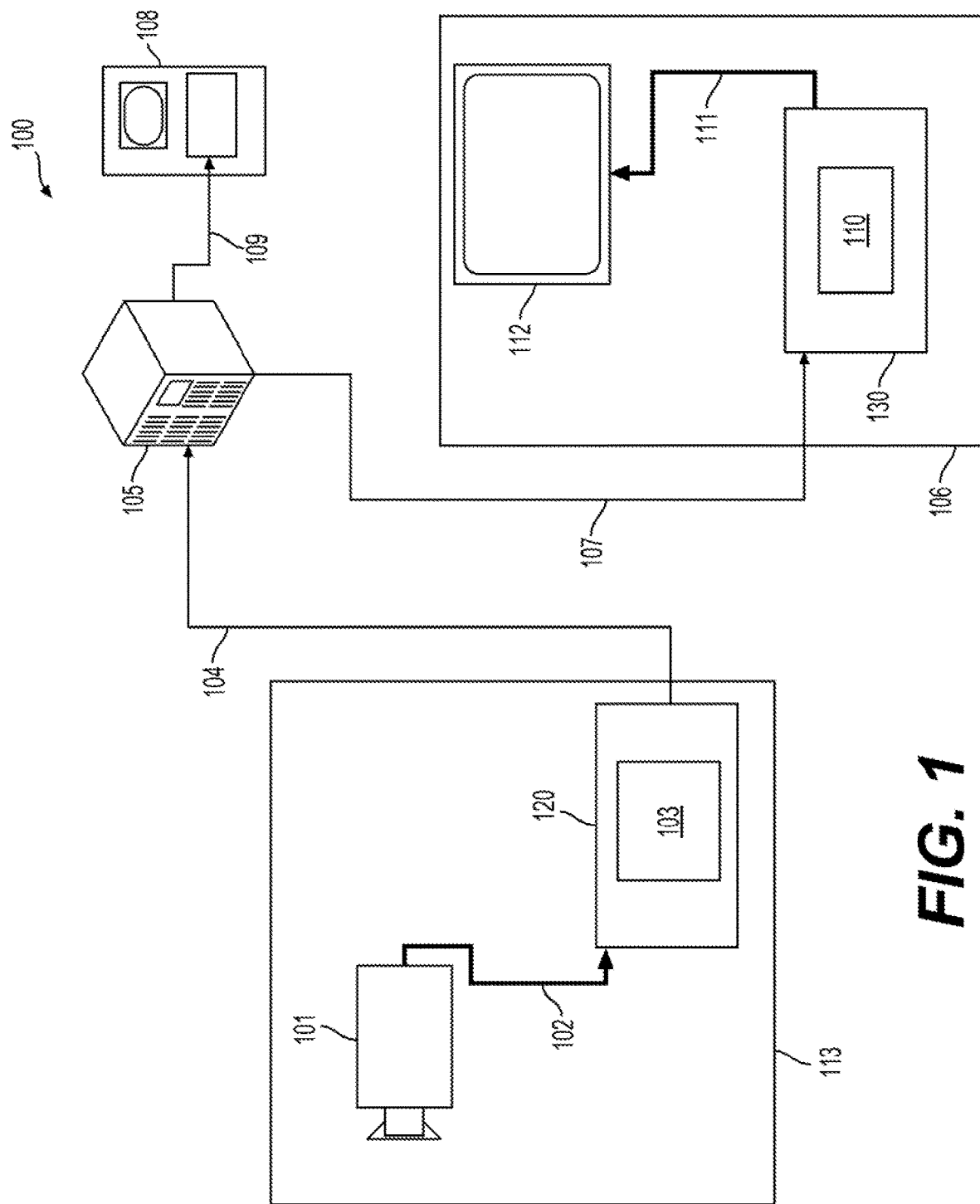
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
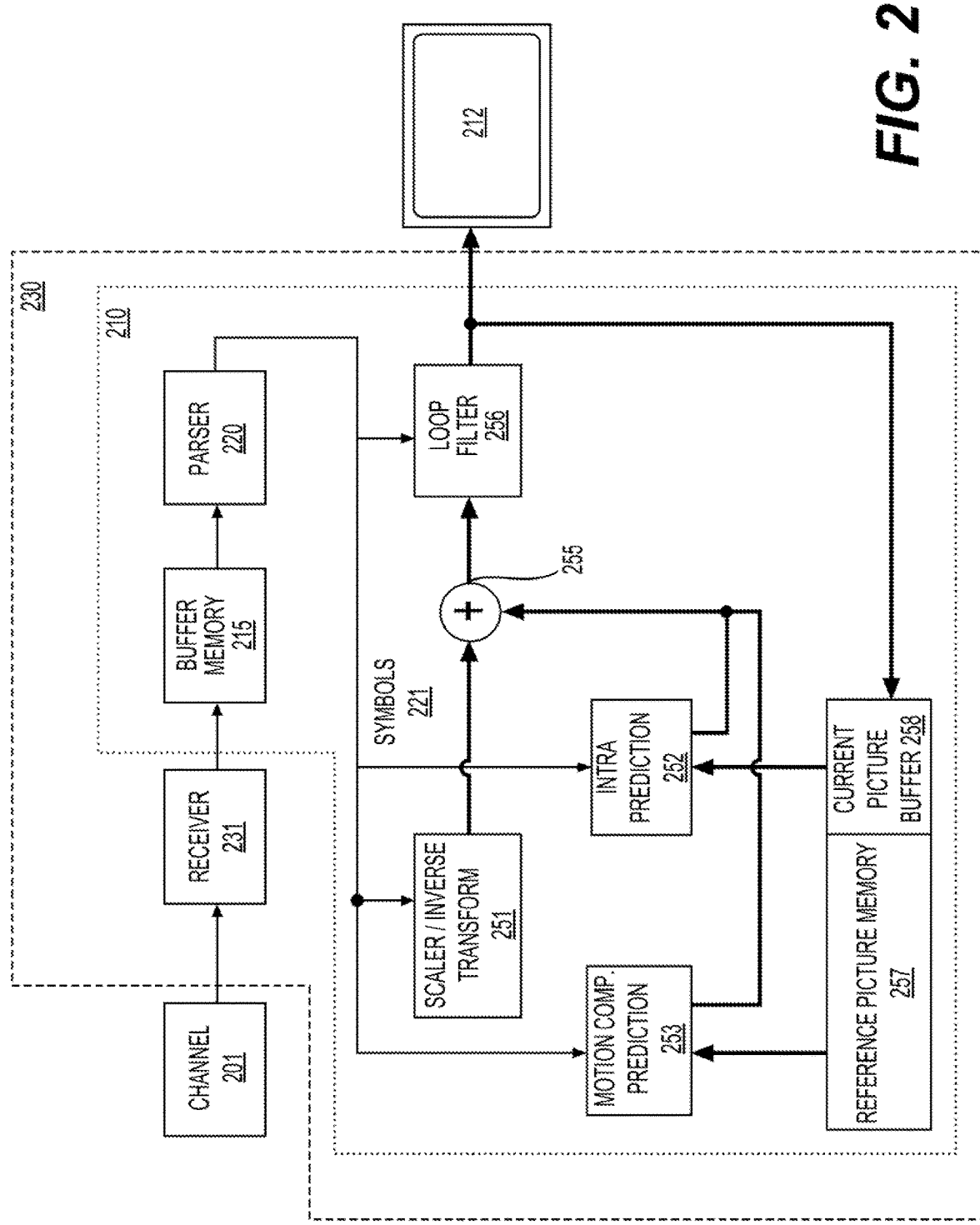
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
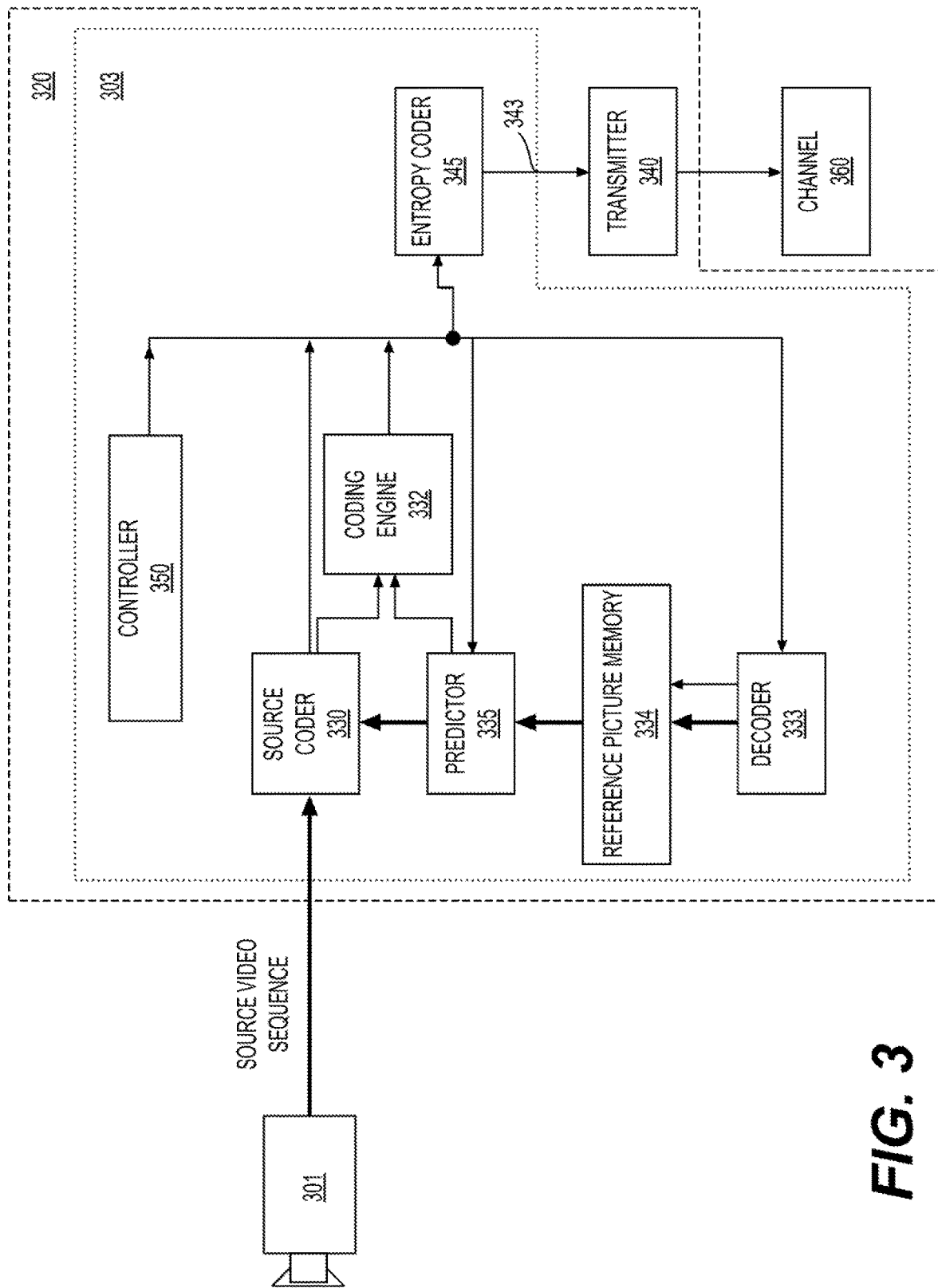
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Aspects of the disclosure provide techniques for coding motion vector difference (MVD), MVD are used in various inter prediction tools, such as merge motion vector difference (MMVD), affine MVD, and the like.

For example, various inter prediction modes can be used in VVC. For an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like. Some inter predictions and related methods are described in details below.

In the following description, MMVD mode is used to illustrate a use of MVD coding. In some examples, MMVD re-uses merge candidate. Among the merge candidates, a candidate can be selected, and is further expanded by the motion vector expression method. In some examples, the motion vector expression includes starting point, motion magnitude, and motion direction.

In some examples (e.g., VVC), MMVD technique can use a merge candidate list to select the candidate for the starting point. However, in an example, only candidates which are default merge type (MRG_TYPE_DEFAULT_N) are considered for MMVD's expansion.

In some examples, a base candidate index is used to define the starting point. The base candidate index indicates the best candidate among candidates in the list as shown in Table 1. For example, the list is a merge candidate list with motion vector predictors (MVP). The base candidate index can indicate the best candidate in the merge candidate list.

TABLE 1

| A example of a base candidate index (IDX) | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

It is noted that in an example, the number of base candidate is equal to 1, then base candidate IDX is not signaled.

In the MMVD mode, after a merge candidate (also referred to as an MV basis or an MV starting point) is selected, the merge candidate can be refined by additional information, such as signaled MVD information. The additional information can indicate a MVD (or a motion offset) to the MV basis. For example, the motion magnitude indicates a magnitude of the MVD, the motion direction indicates a direction of the MVD.

In some examples (e.g., in VVC), for MVD coding, the magnitude value of the MVD (absolute value of the MVD) is signalled first and followed by the sign value. For example, for each of the horizontal component and the vertical component of the MVD, a first flag (e.g., denoted by abs_mvd_greater0_flag) is first coded to indicate whether the absolute value of the component is greater than 0. When the absolute value of the component is greater than 0, then a second flag (e.g., denoted by abs_mvd_greater1_flag) is coded to indicate whether the absolute value of the component is greater than 1. When the absolute value of the component is greater than 1, then the remainder value (absolute value minus 2), such as denoted by abs_mvd_minus2, is coded.

In some examples, the flags abs_mvd_greater0_flag and abs_mvd_greater1_flag are both context coded, and the remainder value abs_mvd_minus2 is binarized using a limited first order Exp-Golomb binarization process and each resulting bin is coded using bypass coding.

FIG. 4 shows pseudo code (400) for MVD signaling in some examples. In the FIG. 4 example, for the horizontal component and the vertical component of the MVD, first flags (abs_mvd_greater0_flag[0] for horizontal component and abs_mvd_greater0_flag[1] for vertical component) are coded to indicate whether the absolute value of the horizontal component and the vertical component are greater than 0. Such as shown by (410) in FIG. 4.

For the horizontal component, when the absolute value of the horizontal component is greater than 0, then a second flag (abs_mvd_greater1_flag[0]) is coded to indicate whether the absolute value of the horizontal component is greater than 1, such as shown by (421) in FIG. 4. When the absolute value of the horizontal component is greater than 1, then the remainder value (absolute value minus 2 denoted by abs_mvd_minus2[0]), is coded, such as shown by (431) in FIG. 4.

For the vertical component, when the absolute value of the vertical component is greater than 0, then a second flag (abs_mvd_greater1_flag[1]) is coded to indicate whether the absolute value of the vertical component is greater than 1, such as shown by (422) in FIG. 4. When the absolute value of the vertical component is greater than 1, then the remainder value (absolute value minus 2 denoted by abs_mvd_minus2[1]), is coded, such as shown by (432) in FIG. 4.

It is noted that each remainder value is coded by codeword of the first order Exp-Golomb binarization process, and includes a prefix and a suffix.

FIG. 5 shows a table (500) that illustrates remainder values and corresponding codewords in some examples. The remainder values are coded by codewords of the first order Exp-Golomb binarization process, and each codeword includes a prefix and a suffix.

In an example, to convert a remainder value to a codeword. The remainder is first converted to a binary. Then, the number of bits in the binary is determined. The number of bits in binary subtracting one is the number of starting zeros in the prefix of the codeword.

In some examples (such as VVC), the sign bits, such as a horizontal sign bit denoted by mvd_sign_flag[0], a vertical sign bit denoted by mvd_sign_flag[1] in FIG. 4, are bypass coded with bins having the 0.5 probability.

Techniques of entropy coding, such as techniques for context-based adaptive binary arithmetic coding (CABAC) can also reduce signaling cost. For example, context models in CABAC for coding a current block can be determined based on information from temporal neighboring blocks (also referred to as temporally co-located blocks) of the current block and/or spatial neighboring blocks of the current block. CABAC can be used for coding various syntax elements, such as an inter affine flag (e.g., inter_affine_flag), a subblock merge flag (e.g., merge_subblock_flag), a local illumination compensation (LIC) flag (e.g., lic_flag) and the like. An inter affine flag associated with a coding block is used to indicate whether the coding block is coded using affine motion compensated prediction. A subblock merge flag associated with a coding block is used to indicate whether the coding block is coded using a sub-block motion compensation mode. An LIC flag associated with a coding block is used to indicate whether the coding block is coded using local illumination compensation.

CABAC is a coding technique used in entropy coding. Generally, the encoding process of CABAC includes a binarization step, a context modeling step and an arithmetic coding step.

In the binarization step for the CABAC based encoding process, a syntax element of nonbinary value can be mapped to a binary sequence, also referred to as a bin string. The binarization step can be bypassed when the syntax element is provided of a value in binary form (e.g., a binary sequence).

In the context modeling step for the CABAC based encoding process, a probability model is determined depending on previously encoded syntax elements. In some examples, a probability model (also referred to as context or context model in CABAC) can be represented by a probability state (also referred to as context state in some examples) and a Most Probable Symbol (MPS) value. The probability state is associated with a probability value and can implicitly represent that the probability of a particular symbol (e.g., a bin) being the Least Probable Symbol (LPS) is equal to the probability value. A symbol can be an LPS or an MPS. For binary symbol, the MPS and the LPS can be 0 or 1. For example, if the LPS is 1, the MPS is 0; and if the LPS is 0, the MPS is 1. The probability value is estimated for the corresponding context and can be used to entropy code the symbol using the arithmetic coder.

The arithmetic coding step of the CABAC based encoding process is based on the principle of recursive interval subdivision according to the probability model. In some examples, the arithmetic coding step is handled by a state machine with a range parameter and a low parameter. The state machine can change values of the range parameter and the low parameter based on the contexts (probability models) and a sequence of bins to code. The value of the range parameter indicates a size of a current range that the coded value (of bins) falls into, and the value of the low parameter indicates the lower boundary of the current range. In an example, according to a probability state (e.g., in association with a probability value), a current range (CurrRange) is divided into a first subrange (MpsRange) (also referred to as MPS range of the current state) and a second subrange (LpsRange) (also referred to as LPS range of the current state). In an example, the second subrange can be calculated by a multiplication, such as using Eq. (1)

$$LpsRange = CurrRange \times \rho \quad \text{Eq. (1)}$$

where $\rho$ is the probability value that the current bin is the LPS. The probability that the current bin is MPS can be calculated by $(1-\rho)$. The first subrange can be calculated by Eq. (2):

$$MpsRange = CurrRange - LpsRange \quad \text{Eq. (2)}$$

In an example, when the current bin is MPS, the value of the low parameter is kept, and the value of the range parameter is updated to MpsRange; and when the current bin is LPS, the value of the low parameter is updated to (low+MpsRange), and the value of the range parameter is updated to LpsRange. Then, the encoding process of CABAC can continue to a next bin in the sequence of bins.

In some examples (e.g., HEVC), the value of the range parameter is expressed with 9 bits and the value of the low parameter is expressed with 10 bits. Further, a renormalization process can be performed to maintain the range and low values at sufficient precision. For example, the renormalization can be performed whenever the value of the range parameter is less than 256. Therefore, the range parameter is equal or larger than 256 after renormalization.

In some examples (e.g., HEVC), 64 possible probability values for the LPS can be used and each MPS can be 0 or 1. In an example, the probability models can be stored as 7-bit entries that correspond to 64 probability values (64 probability states) and 2 possible values for MPS (0 or 1). In each of the 7-bit entries, 6 bits may be allocated for representing the probability state, and 1 bit may be allocated for the MPS.

According to an aspect of the disclosure, a technique that is referred to as template matching (TM) can be used in video/image coding to improve coding efficiency. For example, to further improve the compression efficiency of VVC standard, TM can be used to refine an MV. In an example, the TM is used at a decoder side. With the TM mode, an MV can be refined by constructing a template (e.g., a current template) of a block (e.g., a current block) in a current picture and determine the closest matching between the template of the block in the current picture and a plurality of possible templates (e.g., a plurality of possible reference templates) in a reference picture. In an embodiment, the template of the block in the current picture can include left neighboring reconstructed samples of the block and above neighboring reconstructed samples of the block.

Figure 6:
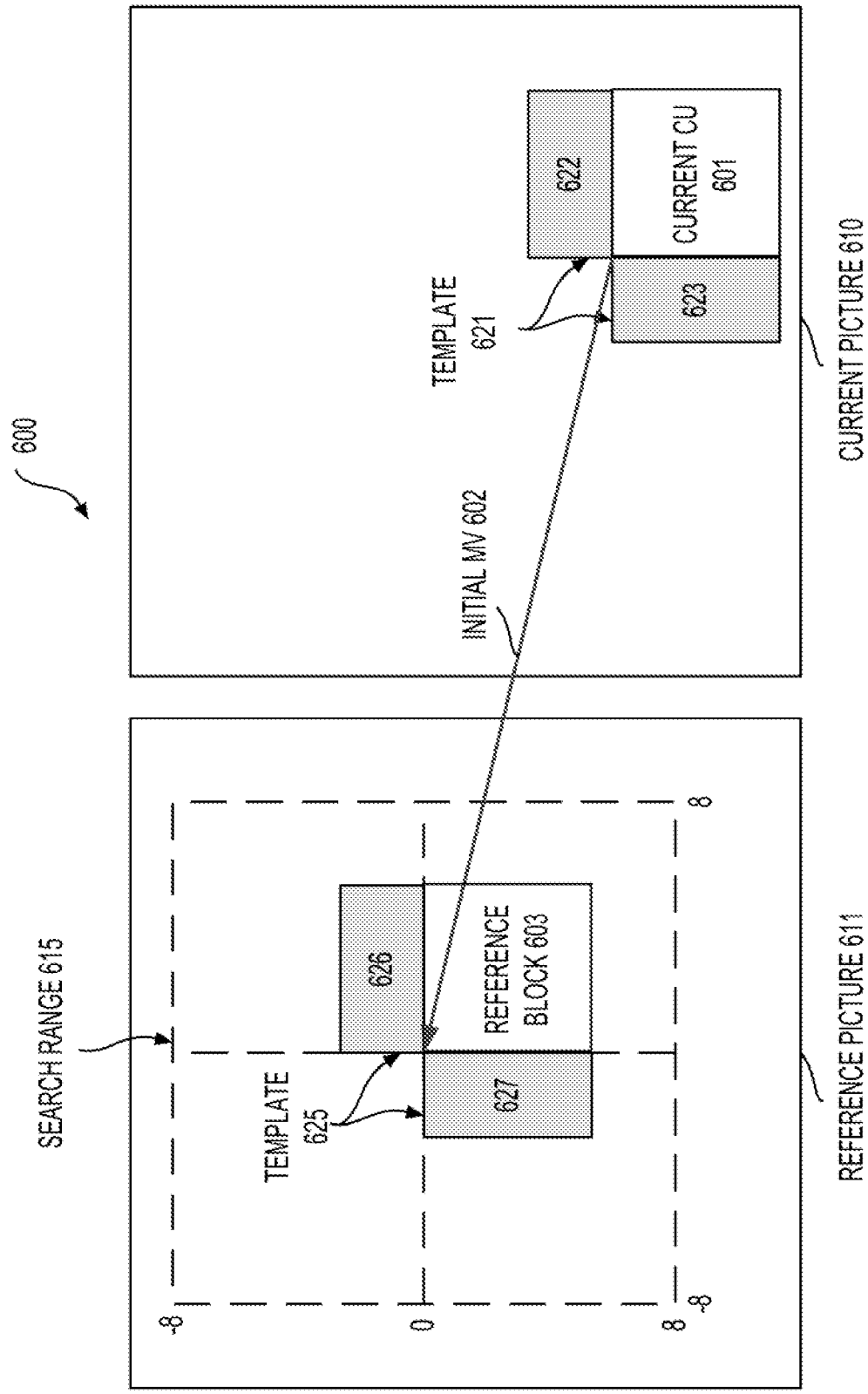
FIG. 6 shows an example of template matching.

FIG. 6 shows an example of template matching (600). The TM can be used to derive motion information (e.g., deriving final motion information from initial motion information, such as an initial MV 602) of a current CU (e.g., a current block) (601) by determining the closest match between a template (e.g., a current template) (621) of the current CU (601) in a current picture (610) and a template (e.g., a reference template) of a plurality of possible templates (e.g., one of the plurality of possible templates being a template (625)) in a reference picture (611). The template (621) of the current CU (601) can have any suitable shape and any suitable size.

In an embodiment, the template (621) of the current CU (601) includes a top template (622) and a left template (623). Each of the top template (622) and the left template (623) can have any suitable shape and any suitable size.

The top template (622) can include samples in one or more top neighboring blocks of the current CU (601). In an example, the top template (622) includes four rows of samples in one or more top neighboring blocks of the current CU (601). The left template (623) can include samples in one or more left neighboring blocks of the current CU (601). In an example, the left template (623) includes four columns of samples in the one or more left neighboring blocks of the current CU (601).

Each one (e.g., the template (625)) of the plurality of possible templates in the reference picture (611) corresponds to the template (621) in the current picture (610). In an embodiment, the initial MV (602) points from the current CU (601) to a reference block (603) in the reference picture (611). Each one (e.g., the template (625)) of the plurality of possible templates in the reference picture (611) and the template (621) in the current picture (610) can have an identical shape and an identical size. For example, the template (625) of the reference block (603) includes a top template (626) in the reference picture (611) and a left template (627) in the reference picture (611). The top template (626) can include samples in one or more top neighboring blocks of the reference block (603). The left template (627) can include samples in one or more left neighboring blocks of the reference block (603).

A TM cost can be determined based on a pair of templates, such as the template (e.g., the current template) (621) and the template (e.g., the reference template) (625). The TM cost can indicate matching between the template (621) and the template (625). An optimized MV (or a final MV) can be determined based on a search around the initial MV (602) of the current CU (601) within a search range (615). The search range (615) can have any suitable shape and any suitable number of reference samples. In an example, the search range (615) in the reference picture (611) includes a [−L, L]-pel range where L is a positive integer, such as 8 (e.g., 8 samples). For example, a difference (e.g., [0, 1]) is determined based on the search range (615), and an intermediate MV is determined by a summation of the initial MV (602) and the difference (e.g., [0, 1]). An intermediate reference block and a corresponding template in the reference picture (611) can be determined based on the intermediate MV. A TM cost can be determined based on the template (621) and the intermediate template in the reference picture (611). The TM costs can correspond to the differences (e.g., [0, 0] corresponding to the initial MV (602), [0, 1], and the like) that are determined based on the search range (615). In an example, the difference corresponding to the smallest TM cost is selected, and the optimized MV is the summation of the difference corresponding to the smallest TM cost and the initial MV (602). As described above, the TM can derive the final motion information (e.g., the optimized MV) from the initial motion information (e.g., the initial MV 602).

In the FIG. 6 example, a better MV can be searched around the initial motion vector of the current CU within a search range, such as [−8pel, +8pel].

In some examples, the signs of MVD can be predicted. For example, TM technique can be used to search possible MVD sign combinations. The possible MVD sign combinations can be sorted according to the template matching costs and index corresponding to the true MVD sign is derived and context coded.

In some examples, at the decoder side, the MVD signs are suitably derived, for example in the following five steps. In a first step, the syntax elements for the magnitudes of MVD components are parsed from the coded video bitstream. In a second step, context coded MVD sign prediction index is parsed from the coded video bitstream. In a third step, MV candidates are built, for example by creating combinations between possible MVD signs and absolute MVD value and adding the combinations to a MV predictor list. In a fourth step, MVD sign prediction cost for each combination in the MV predictor list is derived based on template matching cost and the combinations in the MV predictor list are sorted according to the MVD sign prediction costs associated with the combinations. In a fifth step, the MVD sign prediction index is used to pick a combination in the MV prediction list, the combination includes the true MVD sign that is combined with the absolute MVD value.

The MVD sign prediction technique can be applied to inter AMVP, affine AMVP, MMVD and affine MMVD modes.

It is noted that the template matching based MVD sign prediction can reduce the signaling cost of MVD coding. Some aspects of the present disclosure provide additional prediction techniques to be applied to the coding of the MVD magnitude to further reduce signaling cost. In some examples, encoder/decoder can calculate cost values respectively associated with possible combinations of values for a plurality of bits in coding bits of the MVD. At least one of the plurality of bits is a bit in a codeword for indicating a magnitude for the MVD. The encoder/decoder can determine a combination of prediction values for the plurality of bits from the possible combinations, the combination of prediction values is associated with a lowest cost value in the cost values. The encoder can encode one or more indicators (also referred to as predicted values in some examples) for the combination of prediction values in the coded information of the MVD. The decoder can decode the one or more indicators from the coded information of the MVD. The one or more indicators indicates whether the plurality of bits are correctly predicted by the combination of prediction values.

Some aspects of the disclosure provide techniques to predict the value of the first N bins of the suffix of the codeword of motion vector difference (MVD) coding. In some examples, first order Exp-Golomb binarization is used to generate the codewords for the remainder values in the MVD coding for the magnitude of the horizontal component and the vertical component. Each codeword includes a prefix and a suffix. The present disclosure provide techniques to predict the value of the first N bins of a suffix in a codeword.

In some embodiments, for signaling the first N bins of the suffix of the MVD, instead of signaling the actual value, predicted values are coded in the coded video bitstream. For each bin of the first N bin, the predicted value is a binary value indicating whether the actual value of the bin is correctly predicted or not. In some examples, the predicted values are context coded. In some examples, for different bins of the first N bins of the suffix, different contexts are used for entropy coding.

In some embodiments, the remaining MVD bits, including the pre-fix of the codeword and the remaining bins in the suffix after the first N bins, are signaled in the coded video bitstream. In some examples, the remaining MVD bits are treated as regular MVD magnitude and signaled using the same method as MVD magnitude bits signaling. In some examples, the remaining MVD bits are signaled using equal probability (EP) bins that each bin has equal probability of being "1" or "0". It is noted that bins that is coded using EP are also referred to as bypass coded.

In some embodiments, the prediction values of the first N bins of the suffix (and together with the predicted value of MVD sign) are derived by a template matching process. For example, different combinations of the prediction values and the MVD signs are used to form the possible MVDs. The possible MVDs can point to possible reference blocks. Then, the template matching cost between each possible reference block and the current block is calculated, and the one with minimum template matching cost is selected as the predicted value of the first N bins of the suffix.

Figure 7:
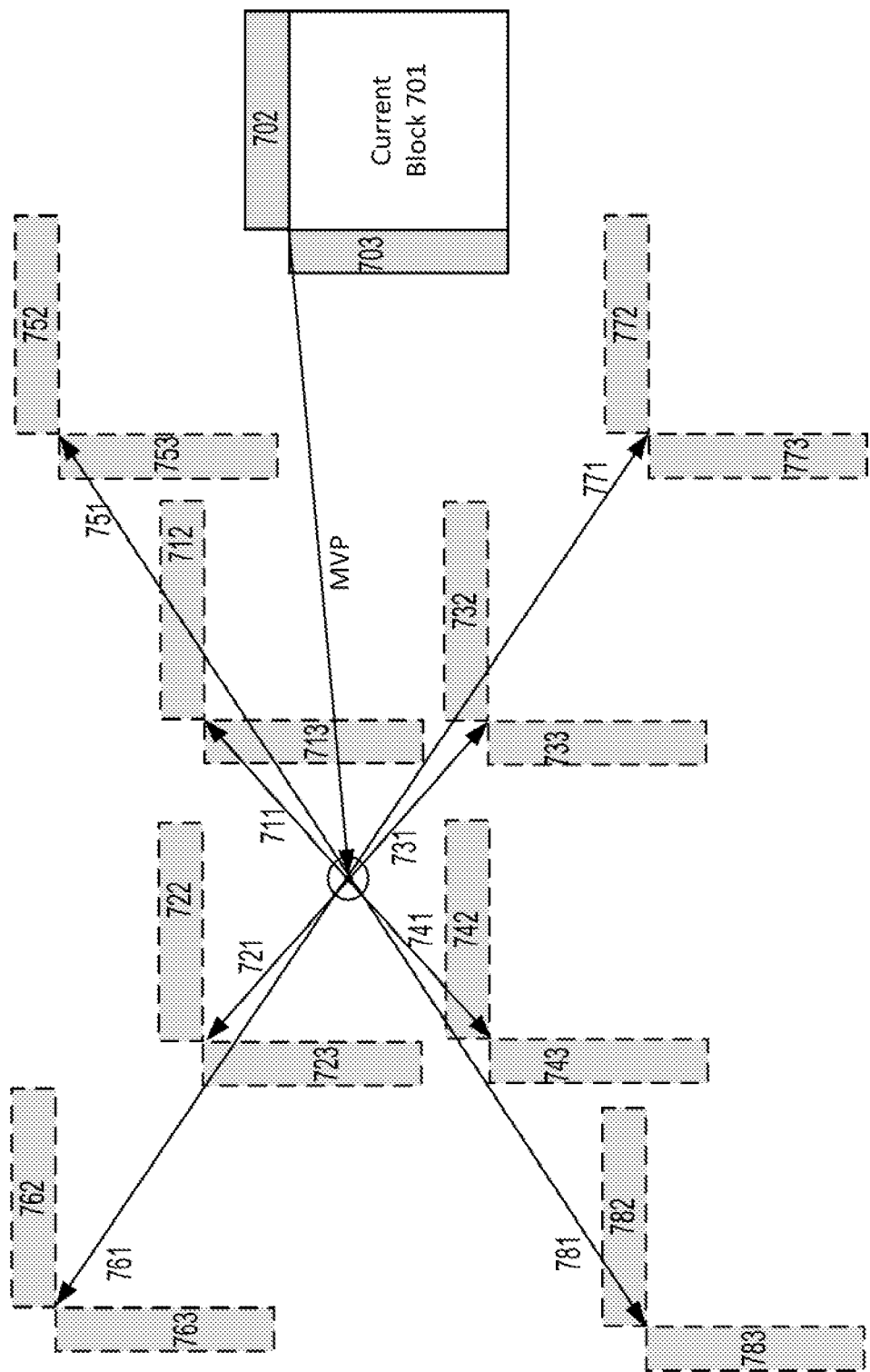
FIG. 7 shows a diagram for template matching based search of MVD sign and magnitude combinations.

FIG. 7 shows a diagram (700) for template matching based search of MVD sign and magnitude combinations. In the FIG. 7 example, a current block (701) is in a current picture. Neighboring samples of the current block (701) can form a template associated with the current block (701). For example, the template associated with the current block (701) includes a top template (702) and a left template (703). Further, in the FIG. 7, a motion vector predictor (MVP) can indicate a basis motion vector.

In an example, different values of a first bin of the suffix for the codeword of horizontal component, different values of a first bin of the suffix for the codeword of the vertical component, and different values for MVD signs can form 16 combinations of MVD candidates that each corresponds to a motion vector difference (MVD). With the MVP, the 16 combinations of MVD candidates can indicate 16 possible reference blocks in a reference picture. Neighboring samples of each possible reference block can form a possible reference template associated with the possible reference block. Further, template matching cost for each of the 16 possible reference templates to the template of the current block is calculated. Then, in an example, the combination with the lowest template matching cost can be selected to generate the prediction value of the first bin of the suffix for the codeword of horizontal component, and the prediction value of the first bin of the suffix for the codeword of the vertical component.

In an example, among the 16 combinations, 8 are shown in FIG. 7, and the other 8 are omitted for ease and clarity. For example, a first combination corresponds to a first MVD (711), the first MVD (711) with the MVP can indicate a first possible reference block in the reference picture, and a first possible reference template associated with the first possible reference block includes a top template (712) and a left template (713). A second combination corresponds to a second MVD (721), the second MVD (721) with the MVP can indicate a second possible reference block in the reference picture, and a second possible reference template associated with the second possible reference block includes a top template (722) and a left template (723). A third combination corresponds to a third MVD (731), the third MVD (731) with the MVP can indicate a third possible reference block in the reference picture, and a third possible reference template associated with the third possible reference block includes a top template (732) and a left template (733). A fourth combination corresponds to a fourth MVD (741), the fourth MVD (741) with the MVP can indicate a fourth possible reference block in the reference picture, and a fourth possible reference template associated with the fourth possible reference block includes a top template (742) and a left template (743). A fifth combination corresponds to a fifth MVD (751), the fifth MVD (751) with the MVP can indicate a fifth possible reference block in the reference picture, and a fifth possible reference template associated with the fifth possible reference block includes a top template (752) and a left template (753). A six combination corresponds to a six MVD (761), the six MVD (761) with the MVP can indicate a six possible reference block in the reference picture, and a six possible reference template associated with the six possible reference block includes a top template (762) and a left template (763). A seven combination corresponds to a seven MVD (771), the seven MVD (771) with the MVP can indicate a seven possible reference block in the reference picture, and a seven possible reference template associated with the seven possible reference block includes a top template (772) and a left template (773). An eight combination corresponds to a eight MVD (781), the eight MVD (781) with the MVP can indicate an eight possible reference block in the reference picture, and an eight possible reference template associated with the eight possible reference block includes a top template (782) and a left template (783).

In some embodiments, the prediction values of the first N bins of the suffix (and together with the predicted value of MVD sign) are derived by a smoothness cost value that measures the smoothness of the block boundary for a candidate MVD value. It is noted that the smoothness cost value can be measured using any suitable smoothness cost metric. In an example, a smoothness cost metric in spatial domain is used. For example, the smoothness cost metric (also referred to as discontinuity cost metric in an example) can be calculated based on sum of absolute sample differences along the block boundary of a reconstructed block, such as along the above block boundary and the left block boundary.

In another example, a smoothness cost metric in transform domain is used. The smoothness cost metric in the transform domain can be estimated as energy of discontinuity on the block boundary in transform domain. In an example, the smoothness cost metric that is used for predicting transform coefficient sign values can be used to evaluate the smoothness.

In some embodiments, the value of N is signaled in high level syntax (HLS), such as video parameter set (VPS), sequence parameter set (SPS), picture header, slice header and the like.

It is noted that, in some examples, the prediction of the first N bits of the suffix of the codeword is only used for a selected subset of prefix values. In some examples, only for the codeword associated with a prefix with more than M bins, the prediction of the first N bits of the suffix of the codeword is applied. Example values of M include but not limited to 1, 2, 3, 4, . . . , 16, and the like.

In some examples, only for the codeword associated with a prefix with more than M bins, the prediction of the first N bins of the suffix of the codeword is applied, and the value of M is signaled in HLS, such as VPS, SPS, picture header, slice header and the like.

Some aspects of the disclosure provide techniques to predict the combination of sign and MVD value, and whether the prediction is correct or not is signaled by one bit.

In some embodiments, based on the signaled remaining MVD bits, the combination of sign and MVD with the best template matching cost is used as the predictor.

In an embodiment, one flag bin in the bitstream is signaled to indicate whether a predictor is used for a MVD horizontal component or a vertical component. If the flag is not used, regular MVD coding is applied on the MVD. In an example, this flag bin is coded with CABAC context model. In another example, this flag bin is signaled as EP bin.

In an embodiment, one flag bin in the bit stream is signaled. When the flag bin is true, the flag bin indicates that the sign and significant bits predictors of both horizontal component and vertical component are used. In an example, when the flag bin is false, the regular MVD coding is applied for both horizontal and vertical MVD component. In another example, when the flag bin is false, each horizontal or vertical component may have a flag bit signaled to indicate whether the predictor is used for this component.

In some embodiment, the combinations of sign and significant MVD is put on an list with an ascending order of the template matching cost. An index is signaled in the bitstream to indicate which prediction is used by the decoder's reconstruction process.

According to some aspects of the disclosure, context coding instead of bypass coding can be used for the first K bins of the prefix of the codeword of MVD. In an embodiment, different contexts are applied for different bins of the first K bins of the prefix of the codeword of MVD.

Figure 8:
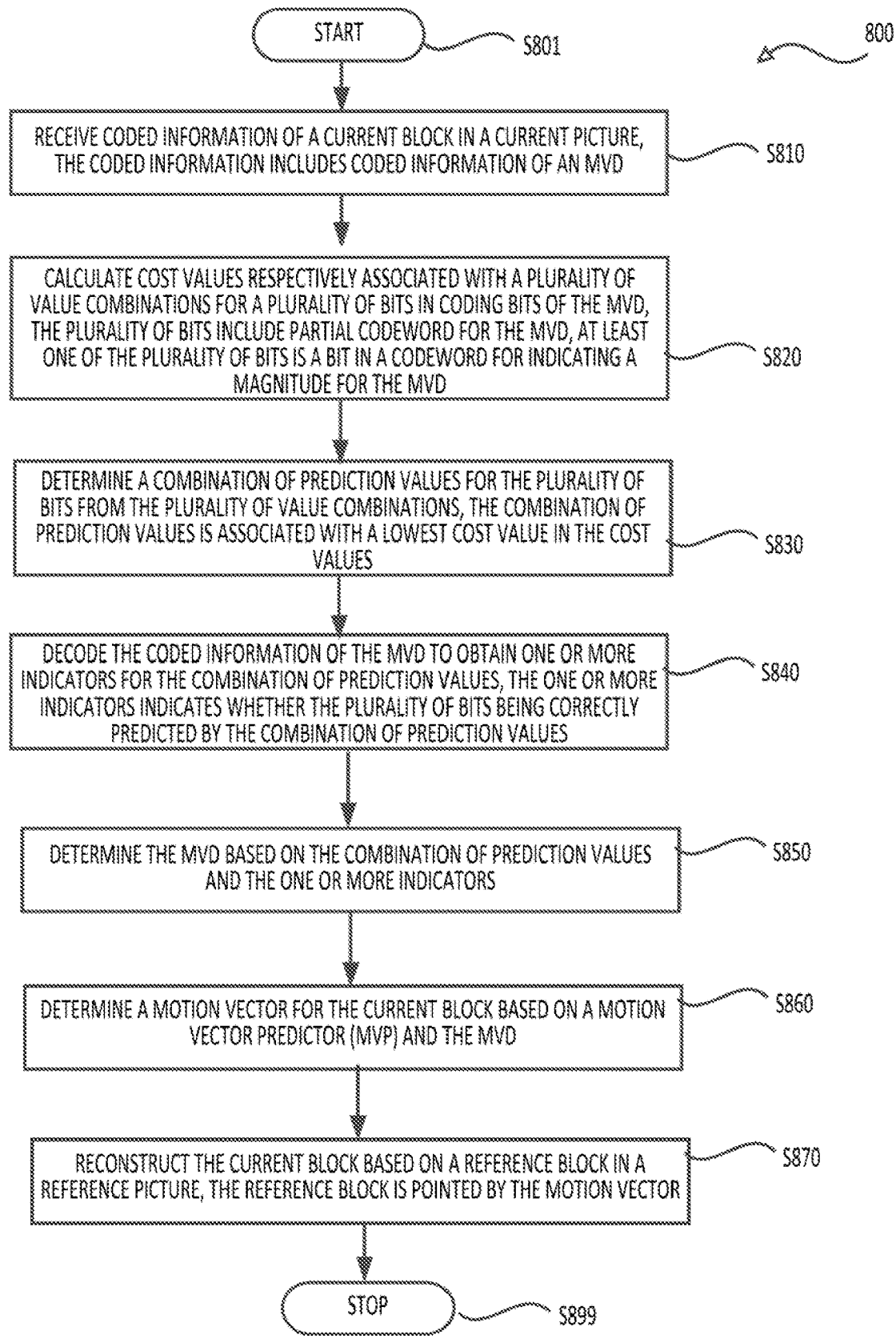
FIG. 8 shows a flow chart outlining another process according to some embodiment of the disclosure.

FIG. 8 shows a flow chart outlining a process (800) according to an embodiment of the disclosure. The process (800) can be used in a video decoder. In various embodiments, the process (800) is executed by processing circuitry, such as the processing circuitry that performs functions of the video decoder (110), the processing circuitry that performs functions of the video decoder (210), and the like. In some embodiments, the process (800) is implemented in software instructions, thus when the processing circuitry executes the software instructions, the processing circuitry performs the process (800). The process starts at (S801) and proceeds to (S810).

At (S810), coded information of a current block in a current picture is received. The coded information includes coded information of a motion vector difference (MVD) between a motion vector prediction (MVP) and a (true) motion vector to be used for a reconstruction of the current block.

At (S820), cost values respectively associated with a plurality of value combinations of a plurality of bits in coding bits of the MVD are calculated. The plurality of bits include partial codeword for the MVD. At least one of the plurality of bits is a bit in a codeword for indicating a magnitude for the MVD.

At (S830), a combination of prediction values for the plurality of bits is determined from the plurality of value combinations, the combination of prediction values is associated with a lowest cost value in the cost values.

At (S840), the coded information of the MVD is decoded to obtain one or more indicators for the combination of prediction values. The one or more indicators indicates whether the plurality of bits are correctly predicted by the combination of prediction values.

At (S850), the (true) MVD is determined based on the combination of prediction values and the one or more indicators.

At (S860), the motion vector for the current block is determined based on the motion vector predictor (MVP) and the MVD.

At (S870), the current block is reconstructed based on a reference block in a reference picture, the reference block is pointed by the motion vector.

In some examples, the plurality of bits includes first N bins of a suffix of a codeword for indicating the magnitude, such as a magnitude of a horizontal component and/or a magnitude of a vertical component of the MVD, N is a positive integer.

In some examples, the one or more indicators include binary values respectively associated with the first N bins of the suffix, a binary value associated with a bin of the suffix indicates whether a prediction value in the combination of prediction values for the bin is correct.

In some examples, the one or more indicators are context coded in the coded information of the MVD. The one or more indicators can be decoded from the coded information of the MVD according to one or more context models.

In some examples, the one or more indicators are context coded in the coded information of the MVD based on respective context models. The one or more indicators can be decoded from the coded information of the MVD according to respective context models.

In some examples, remaining bins of the codeword are decoded from the coded information of the MVD according to equal probability (EP) bins.

In some examples, the plurality of bits include first N bins of a suffix of the codeword and at least an MVD sign. The codeword indicates a magnitude of a horizontal component of the MVD and/or a magnitude of a vertical component of the MVD.

In some examples, template matching cost values respectively associated with the plurality of value combinations are calculated as the cost values.

In some examples, smoothness cost values respectively associated with the plurality of value combinations are calculated as the cost values.

In some examples, N is determined according to a value of a syntax element in at least one of a video parameter set, a sequence parameter set, a picture header and a slice header.

In some examples, a prefix value of the codeword is decoded from the coded information of the MVD. Then, whether the decoded prefix value belongs to a subset of prefix values is determined. In response to the decoded prefix value belonging to the subset of prefix values, the cost values respectively associated with the plurality of value combinations for the plurality of bits are calculated, and further the plurality of bits that includes the first N bins of the suffix of the codeword are predicted according to the cost values. In an example, the subset of prefix values have more than M bins for each prefix value, M is a positive integer. In an example, M is determined according to a value of a syntax element in at least one of a video parameter set, a sequence parameter set, a picture header and a slice header.

In some examples, the coded information of the MVD is decoded to obtain an indicator bit associated with the combination of prediction values, the indicator bit indicates whether the plurality of bits is correctly predicted by the combination of prediction values.

In some examples, a flag bin is decoded from the coded information of the current block, the flag bin indicates whether a predictor (e.g., a combination of prediction values) is used for at least one of a horizontal component and/or a vertical component of the MVD. In an example, the flag bin is context coded. Then, a context model is determined for the flag bin, and the flag bin is decoded according to the context model.

In some examples, the plurality of combinations of values are sorted according the cost values respectively associated with the plurality of value combinations. An index is decoded from the coded information of the current block, and a combination is selected from the sorted value combinations according to the index. The selected combination of values is used as the combination of prediction values for the plurality of bits.

In some examples, at least a context model for coding one or more bins in a prefix of the codeword is determined. The one or more bins in the prefix are decoded based on at least the context model.

In some examples, context models respectively for first K bins in a prefix of the codeword are determined. The first K bins are decoded respectively according to the context models.

Then, the process proceeds to (S899) and terminates.

The process (800) can be suitably adapted. Step(s) in the process (800) can be modified and/or omitted. Additional step(s) can be added. Any suitable order of implementation can be used.

Figure 9:
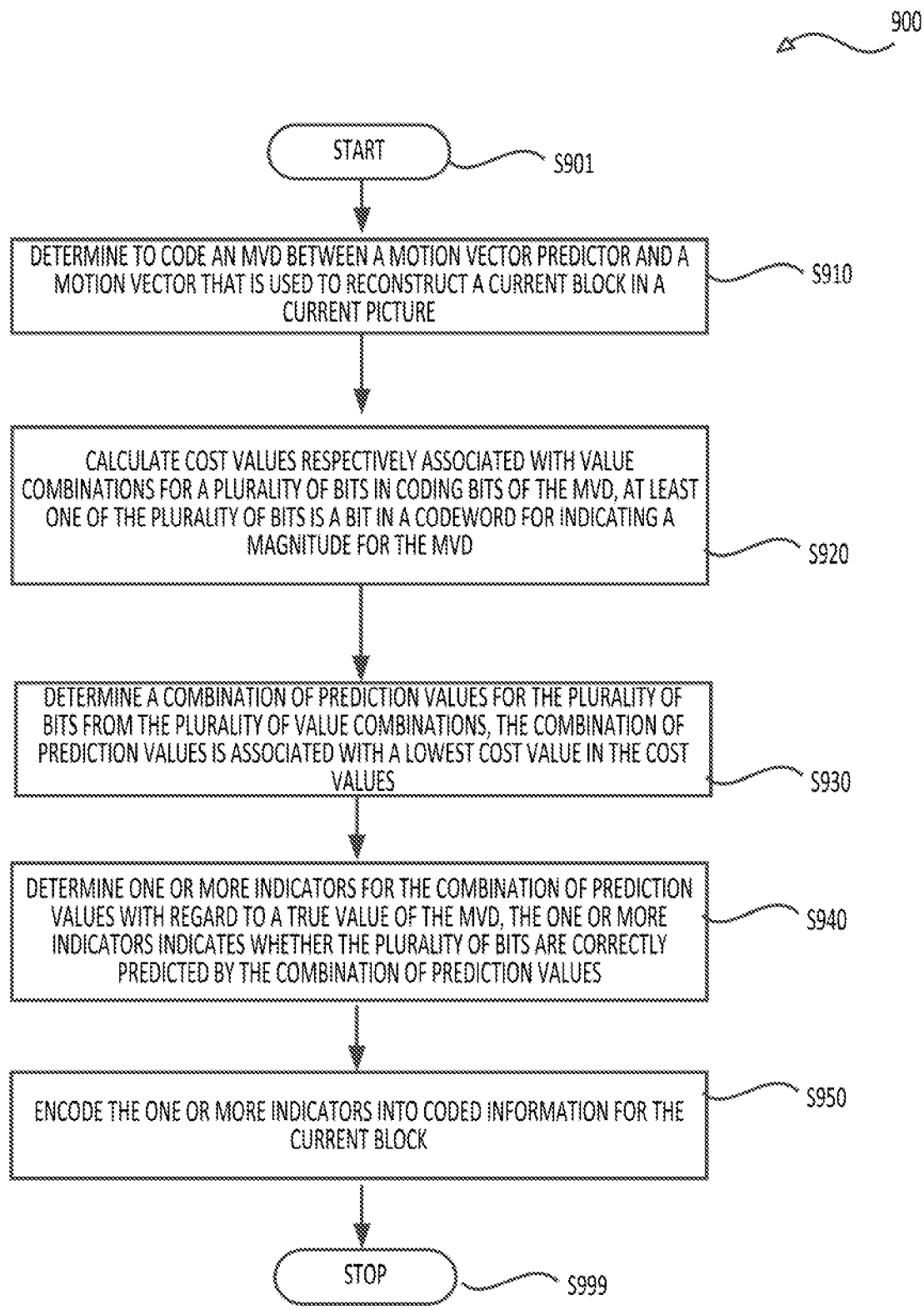
FIG. 9 shows a flow chart outlining a process according to some embodiment of the disclosure.

FIG. 9 shows a flow chart outlining a process (900) according to an embodiment of the disclosure. The process (900) can be used in a video encoder. In various embodiments, the process (900) is executed by processing circuitry, such as the processing circuitry that performs functions of the video encoder (103), the processing circuitry that performs functions of the video encoder (303), and the like. In some embodiments, the process (900) is implemented in software instructions, thus when the processing circuitry executes the software instructions, the processing circuitry performs the process (900). The process starts at (S901) and proceeds to (S910).

At (S910), to code a motion vector difference (MVD) is determined. The MVD is between a motion vector predictor and a motion vector that is used to reconstruct a current block in a current picture.

At (S920), cost values respectively associated with a plurality of value combinations for a plurality of bits in coding bits of the MVD are calculated. The plurality of bits include partial codeword for the MVD. At least one of the plurality of bits is a bit in a codeword for indicating a magnitude for the MVD.

At (S930), a combination of prediction values for the plurality of bits is determined from the plurality of value combinations, the combination of prediction values is associated with a lowest cost value in the cost values.

At (S940), one or more indicators for the combination of prediction values are determined with regard to a true value of the MVD. The one or more indicators indicates whether the plurality of bits are correctly predicted by the combination of prediction values.

At (S950), the one or more indicators are encoded into coded information for the current block.

In some examples, the plurality of bits includes first N bins of a suffix of a codeword for indicating the magnitude, such as a magnitude of a horizontal component and/or a magnitude of a vertical component of the MVD, N is a positive integer.

In some examples, the one or more indicators include binary values respectively associated with the first N bins of the suffix, a binary value associated with a bin of the suffix indicates whether a prediction value in the combination of prediction values for the bin is correct.

In some examples, the one or more indicators are context coded in the coded information of the MVD. The one or more indicators can be encoded according to one or more context models.

In some examples, the one or more indicators are context coded in the coded information of the MVD based on respective context models. The one or more indicators can be encoded into the coded information of the MVD according to respective context models.

In some examples, remaining bins of the codeword are encoded into the coded information of the MVD according to equal probability (EP) bins.

In some examples, the plurality of bits include first N bins of a suffix of the codeword and at least an MVD sign. The codeword indicates a magnitude of a horizontal component of the MVD and/or a magnitude of a vertical component of the MVD.

In some examples, template matching cost values respectively associated with the plurality of value combinations are calculated as the cost values.

In some examples, smoothness cost values respectively associated with the plurality of value combinations are calculated as the cost values.

In some examples, a value of a syntax element in at least one of a video parameter set, a sequence parameter set, a picture header and a slice header can indicate N.

In some examples, when the prefix value belongs to a subset of prefix values, then the coding to the first N bits of the suffix can be predicted according to the present disclosure. In an example, the subset of prefix values have more than M bins for each prefix value, M is a positive integer. In an example, a value of a syntax element in at least one of a video parameter set, a sequence parameter set, a picture header and a slice header indicates M.

In some examples, an indicator bit associated with the combination of prediction values is encoded in the coded information of the MVD, the indicator bit indicates whether the plurality of bits is correctly predicted by the combination of prediction values.

In some examples, a flag bin is encoded into the coded information of the current block, the flag bin indicates whether a predictor (e.g., a combination of prediction values) is used for at least one of a horizontal component and/or a vertical component of the MVD. In an example, the flag bin is context coded.

For example, a context model is determined for the flag bin, and the flag bin is encoded according to the context model.

In some examples, the plurality of value combinations are sorted according the cost values respectively associated with the plurality of value combinations. An index is encoded into the coded information of the current block, and the index indicates a combination from the sorted possible combinations according to the index corresponds to the plurality of bits in the true MVD.

In some examples, at least a context model for coding one or more bins in a prefix of the codeword is determined. The one or more bins in the prefix are encoded based on at least the context model.

In some examples, context models respectively for first K bins in a prefix of the codeword are determined. The first K bins are encoded respectively according to the context models.

Then, the process proceeds to (S999) and terminates.

The process (900) can be suitably adapted. Step(s) in the process (900) can be modified and/or omitted. Additional step(s) can be added. Any suitable order of implementation can be used.

The techniques described above, can be implemented as computer software using computer-readable instructions and physically stored in one or more computer-readable media. For example, FIG. 10 shows a computer system (1000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 10:
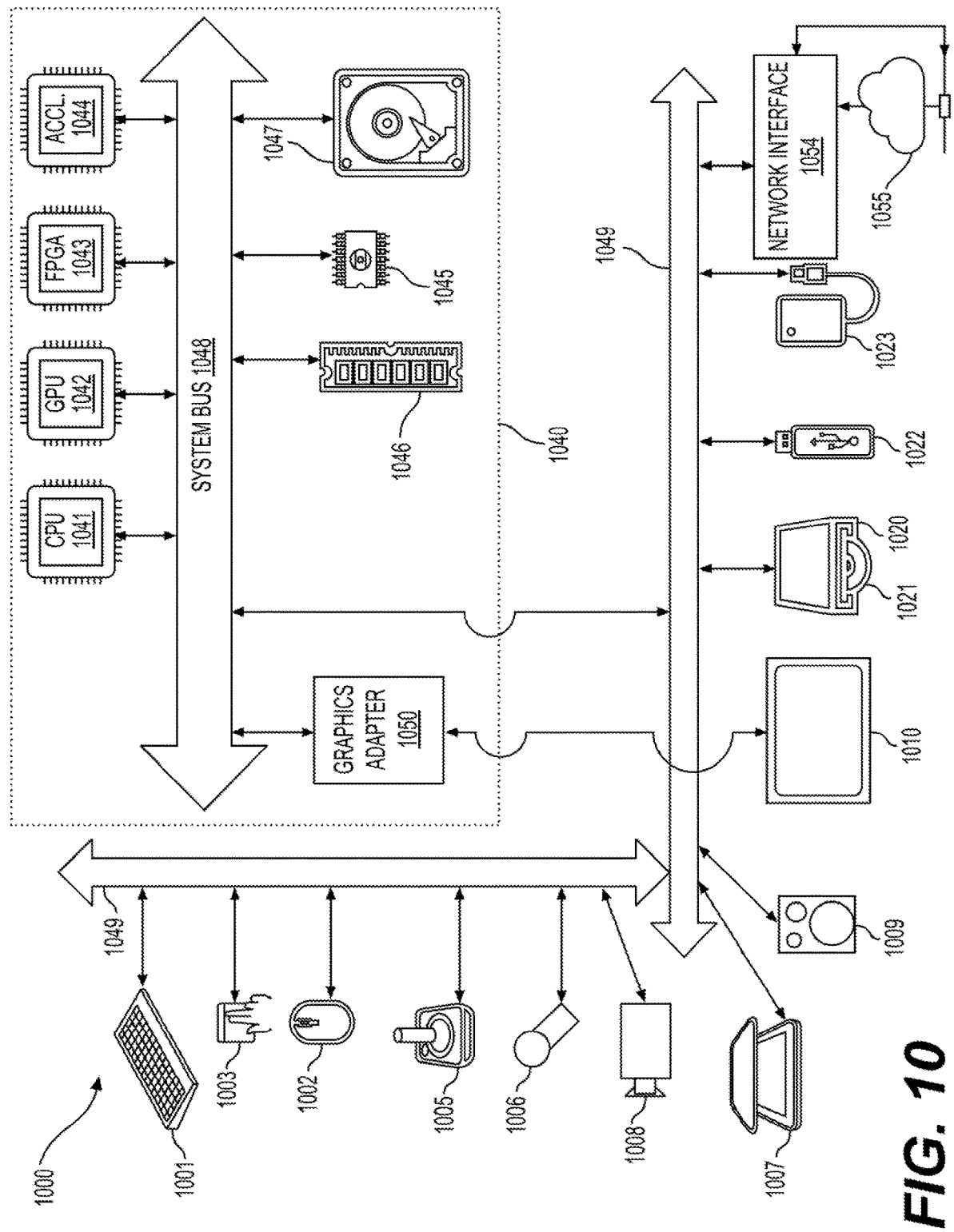
FIG. 10 is a schematic illustration of a computer system in accordance with an embodiment.

The components shown in FIG. 10 for computer system (1000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1000).

Computer system (1000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1001), mouse (1002), trackpad (1003), touch screen (1010), data-glove (not shown), joystick (1005), microphone (1006), scanner (1007), camera (1008).

Computer system (1000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1010), data-glove (not shown), or joystick (1005), but there can also be tactile feedback devices that do not serve as input devices), audio output devices (such as: speakers (1009), headphones (not depicted)), visual output devices (such as screens (1010) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1000) can also include human accessible storage devices and their associated media such as optical media including CD/DVD ROM/RW (1020) with CD/DVD or the like media (1021), thumb-drive (1022), removable hard drive or solid state drive (1023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1000) can also include an interface (1054) to one or more communication networks (1055). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1049) (such as, for example USB ports of the computer system (1000)); others are commonly integrated into the core of the computer system (1000) by attachment to a system bus as described below (for example Ethernet interface into a PC computer system or cellular network interface into a smartphone computer system). Using any of these networks, computer system (1000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1040) of the computer system (1000).

The core (1040) can include one or more Central Processing Units (CPU) (1041), Graphics Processing Units (GPU) (1042), specialized programmable processing units in the form of Field Programmable Gate Areas (FPGA) (1043), hardware accelerators for certain tasks (1044), graphics adapters (1050), and so forth. These devices, along with Read-only memory (ROM) (1045), Random-access memory (1046), internal mass storage such as internal non-user accessible hard drives, SSDs, and the like (1047), may be connected through a system bus (1048). In some computer systems, the system bus (1048) can be accessible in the form of one or more physical plugs to enable extensions by additional CPUs, GPU, and the like. The peripheral devices can be attached either directly to the core's system bus (1048), or through a peripheral bus (1049). In an example, the screen (1010) can be connected to the graphics adapter (1050). Architectures for a peripheral bus include PCI, USB, and the like.

CPUs (1041), GPUs (1042), FPGAs (1043), and accelerators (1044) can execute certain instructions that, in combination, can make up the aforementioned computer code. That computer code can be stored in ROM (1045) or RAM (1046). Transitional data can be also be stored in RAM (1046), whereas permanent data can be stored for example, in the internal mass storage (1047). Fast storage and retrieve to any of the memory devices can be enabled through the use of cache memory, that can be closely associated with one or more CPU (1041), GPU (1042), mass storage (1047), ROM (1045), RAM (1046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1000), and specifically the core (1040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1040) that are of non-transitory nature, such as core-internal mass storage (1047) or ROM (1045). The software implementing various embodiments of the present disclosure can be stored in such devices and executed by core (1040). A computer-readable medium can include one or more memory devices or chips, according to particular needs. The software can cause the core (1040) and specifically the processors therein (including CPU, GPU, FPGA, and the like) to execute particular processes or particular parts of particular processes described herein, including defining data structures stored in RAM (1046) and modifying such data structures according to the processes defined by the software. In addition or as an alternative, the computer system can provide functionality as a result of logic hardwired or otherwise embodied in a circuit (for example: accelerator (1044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:
receiving coded information of a motion vector difference (MVD) associated with a current block in a current picture;
calculating cost values respectively associated with a plurality of value combinations of a plurality of bits from coding bits of the MVD, the plurality of bits comprising a sign bit of the MVD and first N bins of a suffix of a codeword that indicates a magnitude of the MVD, N being an integer greater than 1;
determining a combination of prediction values for the plurality of bits from the plurality of value combinations, the combination of prediction values being associated with a lowest cost value in the cost values;
decoding the coded information of the MVD to obtain one or more indicator bits indicating whether the plurality of bits are correctly predicted by the combination of prediction values;
determining the MVD based on the combination of prediction values and the one or more indicator bits;
determining a motion vector for the current block based on a motion vector predictor (MVP) and the MVD; and
reconstructing the current block based on a reference block in a reference picture, the reference block being pointed to by the motion vector.

2. The method of claim 1, wherein the one or more indicator bits comprise N+1 binary values respectively associated with the sign bit and the first N bins of the suffix, each binary value indicating whether the corresponding bit among the sign bit and the first N bins of the suffix is predicted correctly in the combination of prediction values.

3. The method of claim 2, wherein the one or more indicator bits are context coded in the coded information of the MVD, and the decoding the coded information of the MVD further comprises:
decoding the one or more indicator bits from the coded information of the MVD according to one or more context model.

4. The method of claim 2, wherein the one or more indicator bits are context coded in the coded information of the MVD based on respective context models, and the decoding the coded information of the MVD further comprises:
decoding the one or more indicator bits from the coded information of the MVD according to respective context models.

5. The method of claim 2, wherein the determining the MVD based on the combination of prediction values and the one or more indicator bits further comprises:
decoding remaining bins of the codeword from the coded information of the MVD according to equal probability bins.

6. The method of claim 1, wherein the calculating the cost values respectively associated with the plurality of value combinations further comprises:
calculating template matching cost values respectively associated with the plurality of value combinations.

7. The method of claim 1, wherein the calculating the cost values respectively associated with the plurality of value combinations further comprises:
calculating smoothness cost values respectively associated with the plurality of value combinations.

8. The method of claim 1, further comprising:
determining N according to a syntax element in at least one of a video parameter set, a sequence parameter set, a picture header and a slice header.

9. The method of claim 1, further comprising:
decoding a prefix value of the codeword;
determining that the decoded prefix value belongs to a subset of prefix values; and
when the decoded prefix value belongs to the subset of prefix values, calculating the cost values respectively associated with the plurality of value combinations for the plurality of bits that comprises the sign bit of the MVD and the first N bins of the suffix of the codeword.

10. The method of claim 9, wherein the subset of prefix values have more than M bins for each prefix value, M is a positive integer.

11. The method of claim 10, further comprising:
determining M according to a syntax element in at least one of a video parameter set, a sequence parameter set, a picture header and a slice header.

12. The method of claim 1, wherein the decoding the coded information of the MVD to obtain one or more indicator bits further comprises:
decoding the coded information of the MVD to obtain an indicator bit associated with the combination of prediction values, the indicator bit indicating whether the plurality of bits are correctly predicted by the combination of prediction values.

13. The method of claim 12, further comprising:
decoding a flag bin from the coded information of the current block, the flag bin indicating whether a predictor is applied on at least one of a horizontal component and/or a vertical component of the MVD is predicted.

14. The method of claim 13, wherein the decoding the flag bin further comprises:
determining a context model for the flag bin; and
decoding the flag bin according to the context model.

15. The method of claim 1, further comprising:
sorting the plurality of value combinations according the cost values respectively associated with the plurality of value combinations;
decoding an index from the coded information of the current block; and
selecting a combination from the sorted value combinations according to the index.

16. The method of claim 1, further comprising:
determining at least a context model for coding one or more bins in a prefix of the codeword; and
decoding the one or more bins in the prefix based on at least the context model.

17. The method of claim 1, wherein:
context models are determined respectively for first K bins in a prefix of the codeword; and
the first K bins are decoded respectively according to the context models.

18. A method of video encoding, comprising:
determine a motion vector difference (MVD) associated with a current block in a current picture is to be encoded;
calculating cost values respectively associated with a plurality of value combinations of a plurality of bits from coding bits of the MVD, the plurality of bits comprising a sign bit of the MVD and first N bins of a suffix of a codeword that indicates a magnitude of the MVD, N being an integer greater than 1;
determining a combination of prediction values for the plurality of bits from the plurality of value combinations, the combination of prediction values being associated with a lowest cost value in the cost values;
determining one or more indicator bits indicating whether the plurality of bits of the MVD associated with the current block are correctly predicted by the combination of prediction values; and
encoding the one or more indicator bits into a bitstream.

19. A method of processing visual media data, the method comprising:
processing a bitstream that includes the visual media data according to a format rule, wherein
the bitstream includes coded information of a motion vector difference (MVD) associated with a current block in a current picture; and
the format rule specifies that
cost values respectively associated with a plurality of value combinations of a plurality of bits from coding bits of the MVD are calculated, the plurality of bits comprising a sign bit of the MVD and first N bins of a suffix of a codeword that indicates a magnitude of the MVD, N being an integer greater than 1;
a combination of prediction values for the plurality of bits is determined from the plurality of value combinations, the combination of prediction values being associated with a lowest cost value in the cost values;
the coded information of the MVD is processed to obtain one or more indicator bits indicating whether the plurality of bits are correctly predicted by the combination of prediction values;
the MVD is determined based on the combination of prediction values and the one or more indicator bits;
a motion vector for the current block is determined based on a motion vector predictor (MVP) and the MVD; and
the current block is processed based on a reference block in a reference picture, the reference block being pointed to by the motion vector.

* * * * *